Patented July 11, 1950

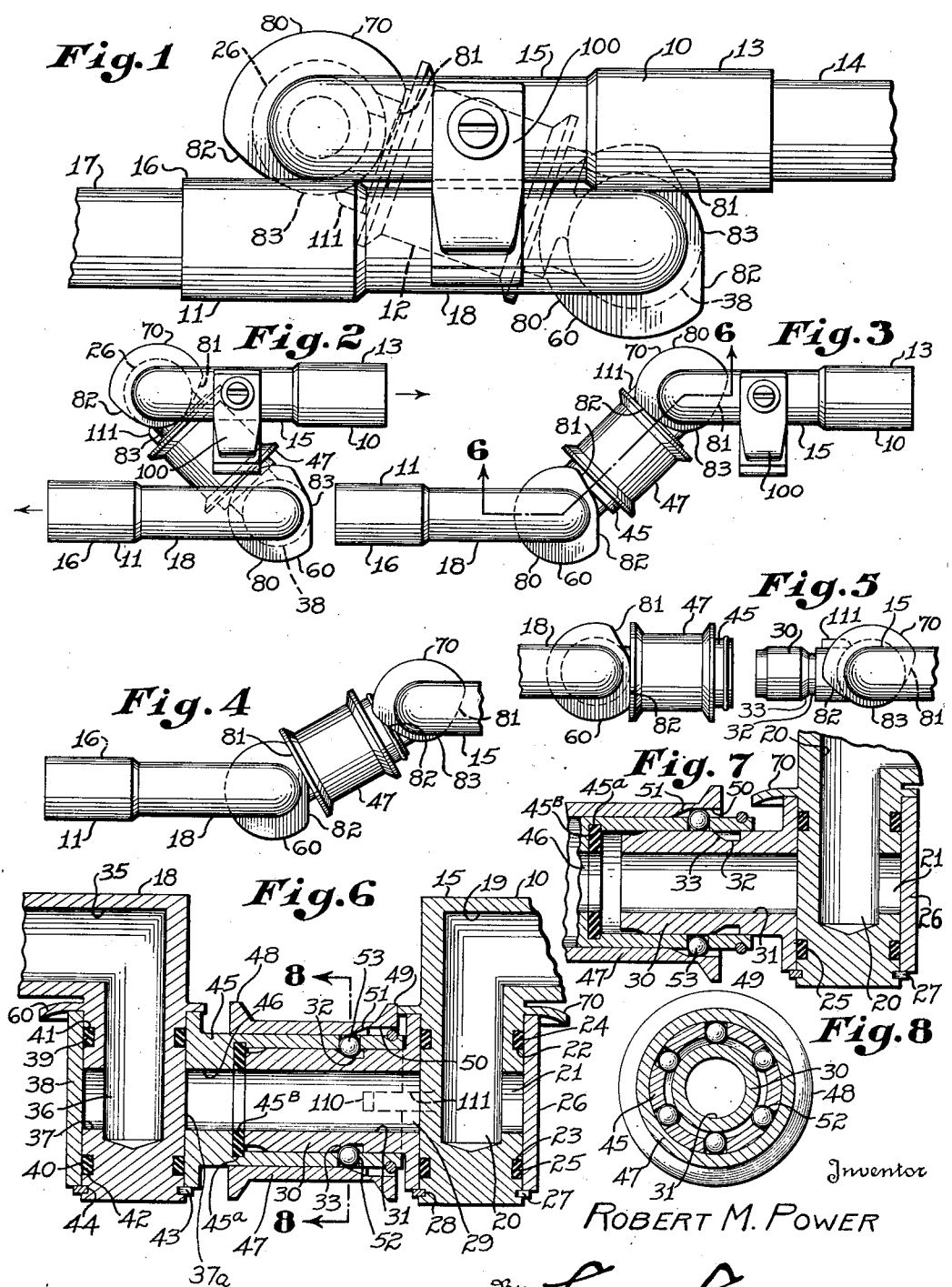

2,514,717

UNITED STATES PATENT OFFICE 2,514,717

HYDRAULIC COUPLING

Robert M. Power, Oxnard, Calif.

Application April 1, 1948, Serial No. 18,420

7 Claims. (Cl. 284—19)

This invention relates to hydraulic couplings, and more particularly to a breakaway type hydraulic coupling having provision made therein for closing off the hydraulic lines prior to disconnection of the coupling, whereby upon disconnection of the coupling loss of fluid is minimized despite the presence of high pressure in the lines and also whereby reconnection of the coupling may be made uninhibited by the presence of such high pressure in the closed off lines.

While the present invention is particularly adaptable for use in coupling the hydraulic lines of tractors to their tows, such as plows or the like, its use is not limited thereto, and the invention may be used advantageously wherever a breakaway coupling is desired between lines carrying fluids under pressure or fluids which it is desired to conserve even though the coupling is "broken." One alternative example of such use is in the lines for fueling ships, especially ships at sea.

Accordingly, it is one object of the present invention to provide a coupling of the type described in which each of the hydraulic lines is closed off prior to "breaking" or disconnecting of the coupling.

It is a further object of this invention to facilitate recoupling of the coupling by assuring that pressure in the lines cannot be communicated to the coupling until it has been completely recoupled.

It is a further object of this invention that on uncoupling, the loss of fluid is limited to the small amount actually present in the center section of the coupling itself. While this is an important feature in any case, it is particularly important in cases where the fluid is valuable or is inflammable and presents a fire hazard, such as in the case of the fueling of ships.

While there are presently available devices operating upon predetermined movement to disconnect such hydraulic couplings, it has been observed that these devices are unsatisfactory for the reasons that either they present difficulties with respect to reconnecting the lines against the pressure therein or else means is interposed in the coupling whereby the flow of fluid in normal connected condition is undesirably restricted. It is, accordingly, one feature of this invention to provide a coupling of the type described which can be very easily connected notwithstanding the pressure in the lines and which presents a smooth, unrestricted passage for the flow of the liquid when connected.

It is a further feature of this invention that uncoupling may be achieved automatically, occurring on a predetermined relative movement of the objects, such as tractor and plow, to which the two sections of the hydraulic lines are secured.

It is a further feature of this invention that cam means are provided operative on such relative movement of the tractor and tow or other device to which the invention is applied, to lock the coupling together and to prevent its breaking until such time as the valve means in the hydraulic lines have been moved to completely closed position.

It is a further feature of this invention that such cam means are provided which positively lock the coupling together upon partial reconnecting of the coupling prior to the opening of the valves or ports in the lines under pressure, thus positively preventing communication of pressure in the lines to the interior of the coupling before the coupling is fully reconnected.

These and other objects, advantages and features of the present invention will be apparent from the annexed specification, in which:

Figure 1 is a plan view of a coupling embodying the present invention in its closed or completely coupled position;

Figure 2 is a plan view on reduced scale similar to Figure 1 showing the coupling moved slightly towards the uncoupled position;

Figure 3 is a view similar to Figure 2 showing the coupling in position about to be broken open;

Figure 4 is a view similar to Figure 3 showing the coupling just prior to completely breaking open;

Figure 5 is a view similar to Figure 4 showing the coupling uncoupled;

Figure 6 is an enlarged section taken on the line 6—6 of Figure 3;

Figure 7 is a fragmentary section similar to Figure 6 showing one end of the coupling in a partially uncoupled position; and Figure 8 is a section taken on the line 8—8 of Figure 6.

Referring now more particularly to the drawings, the coupling is shown as comprising three sections, an end section 10, an end section 11, and a central section 12. End section 10 includes a hose coupling 13 to which is attached hydraulic line 14 and also an elbow 15. The central section 12 includes a breakaway coupling as hereinafter described, while the end section 11 includes a hose coupling 16 to which is attached a hydraulic line 17 and an elbow 18. The elbow 15 has a passage 19 communicating with a passage 20 and a port 21 is provided therein. Furthermore, the elbow 15 has a pair of annular grooves 22 and 23 formed thereon adapted to receive rubber doughnut rings 24 and 25 so that the elbow may be pivotally mounted in a sleeve 26 carried thereon. The sleeve 26 is retained upon the elbow 15 by a spring ring 27 mounted in an annular groove 28 adjacent the bottom of the elbow. The sleeve 26 is provided with a port 29, and aligned with the port 29 is the male member 30 of the coupling. The member 30 has a central bore or passage 31 therein aligning with the port 29. The male member 30 and the sleeve 26 are preferably formed integrally as from a single casting, or from a pair of members suitably connected by welding, brazing, or the like. The male member 30 has a groove 32 formed thereon, which groove 32 is provided with a beveled or tapered wall 33.

The elbow 18 is generally similar to the elbow 15 having a passage 35 communicating with a passage 36 and being provided with a port 37. A sleeve 38 generally similar to the sleeve 26 is mounted on the elbow 18 and sealed by means of doughnut rings 39 and 40 mounted in annular grooves 41 and 42, the sleeve being retained on the elbow by means of a spring ring 43 mounted in annular groove 44.

Also formed integrally with the sleeve 38 is a female member of the coupling 45, which member 45 has a central bore or passage 46 shown aligned with the passage 31 in the member 30. The female member 45 has an internal annular groove 45a formed therein adjacent the sleeve 38 and a washer 45b is seated therein and abutted by the end of the male member 30 in sealing relation when the coupling is fully connected. A sleeve 47 is mounted upon the member 45 provided with a pair of outstanding flanges 48 and 49. The end of the sleeve 47 shown disposed toward the sleeve 26 is counterbored as at 50, forming an enlargement, and a cam 51 is provided in the enlargement. The female member 45 has a plurality of holes 52 bored through the walls thereof, and a corresponding plurality of metallic balls 53 are positioned in these holes. By reference to Figures 6 and 7, it will be noted that on breaking of the coupling, the beveled surface 33 will force the balls 53 upwardly until their entire surface has been displaced beyond the inner wall of the female member 45, provided that the sleeve 47 has been retracted sufficiently to permit this; and further it will be noted that upon moving of the sleeve 47 to the right, as shown in Figure 7, the cam 51 will engage the balls 53 so as to tend to force the balls into the groove 32 if the groove 32 is positioned properly to permit this.

Each of the elbows 15 and 18 is provided with a flange or extension indicated generally by the numbers 60 and 70, which extensions form cams, and the upper edge of the sleeves 26 and 38 is normally in abutting relation with the lower edge of the cams 70 and 60 respectively. The surface of the cams 60 and 70 is best shown in Figures 1 to 5, and each of the cams has a generally circular portion 80 cut away as at 81 and 82, and joined by a smaller radiused circular portion 83.

The operation of the coupling is as follows: Assuming the coupling to be made up and completely coupled as shown in Figure 1, it will be retained in such position by the spring clip 100 resiliently clipping the upper arm of the elbow 15 to the upper arm of the elbow 18 until such time as a pull on either of the lines 14 or 17 causes a pivoting motion. Such a force is shown operating in Figure 2 with the force being applied in the direction of the arrows causing the central portion 12 to revolve counterclockwise, the elbows 15 and 18 pivoting in their respective sleeves 26 and 38. The port 21 in elbow 15 is so arranged as to be in alignment with the port 29 and, similarly, the port 37 of elbow 18 is positioned to be aligned with the port 37a in the sleeve 38 when the coupling is in the closed position shown in Figure 1. It will be apparent that the pivoting of the elbows 15 and 18 in their respective sleeves 26 and 38 will cause the ports to move out of alignment as pivoting progresses. Further, by reference to Figure 2, it will be noted that the larger diameter rounded section 80 of the cam 60 remains in engagement with the rear wall of the flange 48, forcing the sleeve 47 to its extreme rightward position as shown in Figure 6, thus preventing breaking of the coupling. As further relative movement between the lines 14 and 17 is caused, the coupling will pivot to the position shown in Figure 3. In this position the large diameter circular portion 80 of the cam 60 is passed out of contact with the rear wall of the flange 48 of sleeve 47 and the large diameter portion 80 of the cam 70 is beginning to engage the outer wall of the flange 49 and thus force the sleeve 47 to the left, as shown in Figure 6, in position to permit the withdrawing of the male member 30 and the consequent displacement of the balls 53 into the enlarged portion 50 of the sleeve 47. As this happens, as indicated in Figure 4, the coupling breaks open as shown in Figure 5, it being appreciated, however, that the port 21 has been moved entirely out of alignment with the port 29, and the port 37 has been moved entirely out of alignment with the port 37a, before this is permitted. Further, it will be appreciated that by this means the lines 14 and 17 are completely closed prior to the breaking of the coupling, and the only amount of fluid which will become lost is the small amount actually present in the coupling within the passages 31 and 46.

Also, it will be apparent that notwithstanding the fact that there may be a high pressure on the lines 14 and 17, there is no obstacle to recoupling of the coupling, with the parts remaining substantially in the position shown in Figures 4 or 5. In these positions, the lines are closed off as aforesaid, and no pressure can be communicated to the interior of the coupling until the coupling has been pivoted counterclockwise to substantially the position as shown in Figure 1, thus recoupling can be easily and safely effectuated despite high pressures in the lines 14 and 17.

Accordingly, it will be appreciated that this coupling is of the breakaway type and if the tow, such as the plow, etc., should strike a rock or other impediment with sufficient force to break either of the lines 14 or 17, all that can occur is an uncoupling of the coupling without substantial loss of fluid and without serious difficulty upon recoupling.

In order to prevent pivoting of the male member 30 in the female member 45 a slot 110 is milled in the female member 45, and a key 111 formed upon the male member 30 registers with the slot 110 when the coupling is connected.

While there has been described in detail the preferred coupling member of this invention, it will be understood that the specific type of coupling member employing the metallic balls 53 is not essential and that any type of coupling member adapted to be locked on rotation of the coupling to the fully connected position and adapted to be uncoupled on rotation of the elbows to a predetermined angular displacement from said position will suffice.

While there has been described what is at present considered a preferred embodiment of the invention, it will be appreciated by those skilled in the art that various changes and modifications can be made without departing from the essence of the invention, and it is intended to cover herein all such changes and modifications as come within the true scope and spirit of the appended claims.

What is claimed is:

1. A break-away coupling comprising a tubular member having a fluid passage therein and a port communicating with said fluid passage; a sleeve member pivotally mounted on said tubular member and having a port therein; a male coupling member mounted on said sleeve member and having a fluid passage aligned with said port in said sleeve member; a second tubular member; a fluid passage in said second tubular member; a port in said second tubular member communicating with said fluid passage in said second tubular member; a second sleeve member pivotally mounted on said second tubular member; a port in said second sleeve member; a female coupling member mounted upon said second sleeve member; a fluid passage in said female coupling member aligned with said port in said second sleeve member, said female coupling member being adapted to receive said male member when the coupling is coupled; and a latching means operative upon relative movement of said tubular members with respect to said sleeve members to permit uncoupling of said male and female members.

2. A break-away coupling comprising an elbow having a fluid passage therein and a port communicating with said fluid passage; a sleeve member pivotally mounted on said elbow and having a port therein; a male coupling member mounted on said sleeve member and having a fluid passage aligned with said port in said sleeve member; a second elbow; a fluid passage in said second elbow; a port in said second elbow communicating with said fluid passage in said second elbow; a second sleeve member pivotally mounted on said second elbow; a port in said second sleeve member; a female coupling member mounted upon said second sleeve member; a fluid passage in said female coupling member aligned with said port in said second sleeve member, said female coupling member being adapted to receive said male member when the coupling is coupled; a latching means; and means operative to actuate said latching means upon relative movement of said ports in said elbows with respect to said ports in said sleeve.

3. A break-away coupling comprising an elbow having a fluid passage therein and a port communicating with said fluid passage; a sleeve member pivotally mounted on said elbow and having a port therein; a male coupling member mounted on said sleeve member and having a fluid passage aligned with said port in said sleeve member; a second elbow; a fluid passage in said second elbow; a port in said second elbow communicating with said fluid passage in said second elbow; a second sleeve member pivotally mounted on said second elbow; a port in said second sleeve member; a female coupling member mounted upon said second sleeve member; a fluid passage in said female coupling member aligned with said port in said second sleeve member, said female coupling member being adapted to receive said male member when the coupling is coupled; and a latching means; the ports in said elbows being so positioned as to be pivoted out of alignment with the ports in said sleeve members prior to unlatching of said latching means to permit uncoupling of said male and female members, said latching means comprising a sleeve mounted on said female member and in one position preventing the uncoupling of said male and female members and a cam on said second elbow engaging said sleeve and retaining said sleeve in said one position until the ports of said sleeve members have been pivoted completely out of alignment with the ports in said elbows.

4. A break-away coupling comprising an elbow having a fluid passage therein and a port communicating with said fluid passage; a sleeve member pivotally mounted on said elbow and having a port therein; a male coupling member mounted on said sleeve member and having a fluid passage aligned with said port in said sleeve member; a second elbow; a fluid passage in said second elbow; a port in said second elbow communicating with said fluid passage in said second elbow; a second sleeve member pivotally mounted on said second elbow; a port in said second sleeve member; a female coupling member mounted upon said second sleeve member; a fluid passage in said female coupling member aligned with said port in said second sleeve member, said female coupling member being adapted to receive said male member when the coupling is coupled; and a latching means; the ports in said elbows being so positioned as to be pivoted out of alignment with the ports in said sleeve members prior to unlatching of said latching means to permit uncoupling of said male and female members, said latching means comprising a sleeve mounted on said female member and in one position preventing the uncoupling of said male and female members and a cam on said second elbow engaging said sleeve and retaining said sleeve in said one position until the ports of said sleeve members have been pivoted completely out of alignment with the ports in said elbows and a cam on said first elbow adapted to engage said sleeve after said ports of said sleeve members have been pivoted out of alignment with the ports in said elbows and move said sleeve to unlatching position.

5. A break-away coupling comprising an elbow having a fluid passage therein and a port communicating with said fluid passage; a sleeve member pivotally mounted on said elbow and having a port therein; a male coupling member mounted on said sleeve member and having a fluid passage aligned with said port in said sleeve member; a second elbow; a fluid passage in said second elbow; a port in said second elbow communicating with said fluid passage in said second elbow; a second sleeve member pivotally mounted on said second elbow; a port in said second sleeve member; a female coupling member mounted upon said second sleeve member; a fluid passage in said female coupling member aligned with said port in said second sleeve member, said female coupling member being adapted to receive said male member when the coupling is coupled; an annular groove on said male member; a plurality of holes in the walls of said female member adapted to receive and retain a corresponding plurality of metallic balls; a sleeve on said female member; an enlarged portion in said sleeve adapted to receive a portion of each of said metallic balls on uncoupling of the coupling and a cam in said sleeve adapted to force a portion of each of said metallic balls into said groove on said male member in coupled position and a cam on said elbow engaging said sleeve and retaining said sleeve in coupled position until the ports of said sleeve members have been pivoted completely out of alignment with the ports in said elbows.

6. A break-away coupling comprising an elbow having a fluid passage therein and a port communicating with said fluid passage; a sleeve member pivotally mounted on said elbow and having a port therein; a male coupling member mounted on said sleeve member and having a fluid passage aligned with said port in said sleeve member; a second elbow; a fluid passage in said second elbow; a port in said second elbow communicating with said fluid passage in said second elbow; a second sleeve member pivotally mounted on said second elbow; a port in said second sleeve member; a female coupling member mounted upon said second sleeve member; a fluid passage in said female coupling member aligned with said port in said second sleeve member, said female coupling member being adapted to receive said male member when the coupling is coupled; an annular groove on said male member; a plurality of holes in the walls of said female member adapted to receive and retain a plurality of metallic balls; a sleeve on said female member; an enlarged portion in said sleeve adapted to receive a portion of each of said metallic balls on uncoupling of the coupling and a cam in said sleeve adapted to force a portion of each of said metallic balls into said groove on said male member in coupled position and a cam on said elbow engaging said sleeve and retaining said sleeve in coupled position until the ports of said sleeve members have been pivoted completely out of alignment with the ports in said elbows and a cam on said first elbow adapted to engage said sleeve after said ports of said sleeve members have been pivoted completely out of alignment with the ports in said elbows and move said sleeve to unlatching position.

7. A break-away coupling comprising an elbow having a fluid passage therein and a port communicating with said fluid passage; a sleeve member pivotally mounted on said elbow and having a port therein; a male coupling member mounted on said sleeve member and having a fluid passage aligned with said port in said sleeve member; a second elbow; a fluid passage in said second elbow; a port in said second elbow communicating with said fluid passage in said second elbow; a second sleeve member pivotally mounted on said second elbow; a port in said second sleeve member; a female coupling member mounted upon said second sleeve member; a fluid passage in said female coupling member aligned with said port in said second sleeve member, said female coupling member being adapted to receive said male member when the coupling is coupled; an annular groove on said male member; a plurality of holes in the walls of said female member adapted to receive and retain a plurality of metallic balls; a sleeve on said female member; an enlarged portion in said sleeve adapted to receive a portion of each of said metallic balls on uncoupling of the coupling and a cam in said sleeve adapted to force a portion of each of said metallic balls into said groove on said male member in coupled position and a cam on said elbow engaging said sleeve and retaining said sleeve in coupled position until the ports of said sleeve members have been pivoted completely out of alignment with the ports in said elbows; and a cam on said first elbow adapted to engage said sleeve after said ports of said sleeve members have been pivoted completely out of alignment with the ports in said elbows and move said sleeve to unlatching position, the fluid passage in said male coupling member in fully coupled position fully aligning with said ports in said first sleeve members and said port in said second elbow to provide an unrestricted fluid passage.

ROBERT M. POWER.

No references cited.